(12) United States Patent
Osness et al.

(10) Patent No.: US 10,329,169 B2
(45) Date of Patent: Jun. 25, 2019

(54) COLLOIDAL SILICA ADDITION TO PROMOTE THE SEPARATION OF OIL FROM WATER

(71) Applicant: Baker Hughes Incorporated, Houston, TX (US)

(72) Inventors: Keith A. Osness, Sugar Land, TX (US); Carlos J. Diaz, Humble, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 352 days.

(21) Appl. No.: 14/179,177

(22) Filed: Feb. 12, 2014

(65) Prior Publication Data
US 2014/0224733 A1    Aug. 14, 2014

Related U.S. Application Data

(60) Provisional application No. 61/764,765, filed on Feb. 14, 2013.

(51) Int. Cl.
| | |
|---|---|
| C02F 1/28 | (2006.01) |
| C02F 1/54 | (2006.01) |
| E21B 21/06 | (2006.01) |
| C02F 1/52 | (2006.01) |
| C02F 1/68 | (2006.01) |
| B01D 17/04 | (2006.01) |

(Continued)

(52) U.S. Cl.
CPC ............ *C02F 1/281* (2013.01); *B01D 17/047* (2013.01); *C02F 1/5245* (2013.01); *C02F 1/54* (2013.01); *C02F 1/681* (2013.01); *E21B 21/068* (2013.01); *C02F 1/40* (2013.01); *C02F 1/56* (2013.01); *C02F 2101/325* (2013.01); *C02F 2103/365* (2013.01)

(58) Field of Classification Search
None
See application file for complete search history.

(56) References Cited

U.S. PATENT DOCUMENTS

| | | | |
|---|---|---|---|
| 3,316,181 A * | 4/1967 | Sackis | B01D 17/047 208/188 |
| 4,795,531 A | 1/1989 | Sofia et al. | |

(Continued)

FOREIGN PATENT DOCUMENTS

| | | |
|---|---|---|
| EP | 0765844 A1 | 4/1997 |
| EP | 0773319 A1 | 5/1997 |

(Continued)

OTHER PUBLICATIONS

Manning et al. (Oilfield Processing vol. Two: Crude Oil, PennWell Publishing Company, Tulsa, Oklahoma, 1995, pp. 1-2).*

(Continued)

*Primary Examiner* — Clare M Perrin
(74) *Attorney, Agent, or Firm* — Mossman, Kumar and Tyler, PC (57) ABSTRACT

The combination of colloidal silica in conjunction with a chemical, such as a cationically-modified water soluble polymer, e.g. aluminum brine dispersion polymer, clarifies combinations of oil and water, for instance wastewater comprising an oil-in-water emulsion. The colloidal silica may have an average silica particle size of about 0.5 to about 10 nanometers.

5 Claims, 3 Drawing Sheets

(51) Int. Cl.
*C02F 1/40* (2006.01)
*C02F 1/56* (2006.01)
*C02F 103/36* (2006.01)
*C02F 101/32* (2006.01)

(56) References Cited

U.S. PATENT DOCUMENTS

| | | | |
|---|---|---|---|
| 4,855,060 A | 8/1989 | Durham et al. | |
| 5,006,274 A | 4/1991 | Durham et al. | |
| 5,100,582 A | 3/1992 | Bhattacharyya | |
| 5,190,683 A * | 3/1993 | Evain | C02F 1/54 |
| | | | 210/728 |
| 5,620,629 A | 4/1997 | Salmen et al. | |
| 5,667,697 A * | 9/1997 | Salmen | C02F 1/5236 |
| | | | 210/727 |
| 5,921,912 A * | 7/1999 | Hart | B01D 17/047 |
| | | | 210/708 |
| 6,036,868 A * | 3/2000 | Sivakumar | B01D 17/047 |
| | | | 210/708 |
| 6,132,625 A * | 10/2000 | Moffett | C02F 1/5236 |
| | | | 210/705 |
| 6,372,806 B1 * | 4/2002 | Keiser | C01B 33/143 |
| | | | 106/432 |
| 6,486,216 B1 | 11/2002 | Keiser et al. | |
| 6,780,330 B2 | 8/2004 | Moffett et al. | |
| 7,531,600 B1 | 5/2009 | Rey | |
| 2003/0065041 A1 | 4/2003 | Keiser et al. | |
| 2006/0006116 A1 | 1/2006 | Scheimann et al. | |
| 2009/0202816 A1 * | 8/2009 | Schlenoff | B82Y 30/00 |
| | | | 428/331 |
| 2011/0272362 A1 * | 11/2011 | Sikes | C02F 1/56 |
| | | | 210/705 |

FOREIGN PATENT DOCUMENTS

| | | |
|---|---|---|
| JP | 3774652 | 6/2002 |
| KR | 0158697 | 11/1998 |
| WO | 199635731 A1 | 11/1996 |
| WO | 2003100169 A1 | 12/2003 |

OTHER PUBLICATIONS

Levasil ("Colloidal Silica", accessed online Nov. 26, 2018, pp. 1-6. (Year: 2018).*

* cited by examiner

COLLOIDAL SILICA ADDITION TO PROMOTE THE SEPARATION OF OIL FROM WATER

CROSS-REFERENCE TO RELATED APPLICATION

This application claims the benefit of U.S. Provisional Patent Application Ser. No. 61/764,765 filed Feb. 14, 2013, incorporated herein by reference in its entirety.

TECHNICAL FIELD

The present invention relates to compositions and methods used in separating oil from water, such as to clarify water, and more particularly relates in non-limiting embodiments to compositions and methods for removing oil from water using colloidal silica and a chemical such as a cationic polymer.

TECHNICAL BACKGROUND

At least two fluids may be mixed together to form a dispersion where one phase, a discontinuous phase, is dispersed in another, continuous phase, of a different composition or phase. An emulsion is a dispersion having two immiscible liquids where one phase is dispersed as droplets (the non-continuous or internal phase) in the other (the continuous or external phase). Thus, all emulsions are dispersions, but not all dispersions are emulsions. While emulsions are typically unstable thermodynamically, some form of mechanical, electrical and/or chemical treatment is often required for rapid and efficient separation of the immiscible phases.

In the petroleum industry, various operations including, but not limited to, exploration, production, refining and chemical processing of hydrocarbons including, but not limited to, crude oil, gas and their derivative products, routinely produce mixtures and dispersions of oil and water. Such mixtures may also contain other compounds, such as waxes, asphaltenes, various salts, suspended materials, biological surface active material from the ground, added surface active corrosion/scale inhibiting reagents, etc., which may vary from location to location. In addition, synthetic and natural surfactants, produced either in-situ or added in enhanced oil recovery techniques such as alkali-surfactant (AS) and alkali-surfactant-polymer (ASP) floods, can cause phase separation issues. Along with the presence of these other compounds, high shear and mixing forces may cause these oil and water mixtures to form relatively stable emulsions. Some such emulsions are water in oil emulsions, commonly referred to in the petroleum industry as "regular emulsions" where oil is the continuous phase. Others are oil in water emulsions, commonly referred to in the petroleum industry as "reverse emulsions" where water is the continuous phase.

"Breaking" an emulsion means to separate the oil-based liquid phase and the water-based phase. The term "breaking" implies that the emulsifying films around the droplets of water or oil are "broken" so that coalescing may occur and result in separation of the phases over time, for example, by gravitational settling or the application of an electrical field. For example, demulsifiers or emulsion breakers may be added to a fluid stream to break or separate an emulsion, whether normal or reverse, into its constituent phases. Clarifiers may be added to a fluid stream to break emulsions and separate the oil phase from the water phase, thereby, making the water "clearer." There is known to be some overlap in the types of compounds which effectively demulsify and those which clarify, i.e., some compounds are useful for both demulsifying and clarifying oil-water emulsions and dispersions.

During the production phase of an oil well, formation water is also produced from the well in combination with the oil. Further, in many secondary and tertiary oil recovery techniques such as steam or water flooding, oil extraction from tar/oil sands and steam assisted gravity drainage (SAGD), large amounts of water are used to recover oil. In such circumstances, the oil typically comes out of the ground as an emulsion. To break this emulsion or separate the water-based phase from the oil-based phase, demulsifiers such as polyalkylene glycols (PAGs), block copolymers of poly(ethylene oxide) (PEO) and poly(propylene oxide) (PPO), and alkylphenol resin alkoxylates may be generally used. In some cases, water clarifiers are also added to the mixed production stream.

Once the emulsion is separated into an oil fraction and a water fraction, the produced water fraction (i.e., "produced water") may contain oil entrained in the water-based phase. In other words, a "reverse" i.e., oil-in-water, emulsion is formed. This emulsion may appear as a turbid, sometimes brown or black phase, depending on the amount of impurities present. Such produced water may be generated in very large quantities (i.e., up to millions of gallons per day), and is usually either re-injected into the formation, or disposed of into the ocean. Governmental regulations, such as the US Clean Water Act and the US EPA Code of Federal Regulations in the United States, require reduction of the amount of oil content down to very low levels before the produced water may be discharged. Although the amount of oil permitted in discharged water under such regulations varies from jurisdiction to jurisdiction, the standard is generally very low, such as less than 29 ppm oil in water as an example. Further, with the increasing cost and regulation on fresh water use, low levels of oil are demanded for water reuse. The practice of reducing the oil in water is commonly known as "clarification," and is simply the breaking of the reverse emulsion. Clarification of such demulsified oilfield water may involve the use of acrylate polymers, cationic polymers, cationic polyelectrolytes, and water-soluble amphiphilic polymers to flocculate suspended oily and particulate materials and, thereby, obtain clear(er) water.

Successful selection and use of effective polymer compounds to demulsify and clarify oil-water emulsions formed during petroleum industry operations may be very complex because whether or not a particular polymer will work depends on the geometry of the production system, the source of water, the nature of suspended solids, the composition of the oil, the nature of other reagents used, etc. Thus, there is no one single, universal solution for the practice of demulsification and clarification of oilfield emulsions. Depending on individual oilfields and the conditions involved, different chemicals, e.g. polymers, will provide optimum performance in different locations.

U.S. Pat. Nos. 4,855,060 and 5,006,274 to Baker Hughes Incorporated involve methods and additives for clarifying an aqueous system which may contain an oil-in-water emulsion, a dispersion of a non-aqueous discontinuous phase, without production of a resultant uncontrollable floc in the system, by contacting the system with an effective water clarifying amount of a composition having present a dithiocarbamate of bishexamethylenetriamine (BHMT). The composition is maintained in the system for sufficient time to effectively clarify the system without production of an uncontrollable floc.

One chemical solution to the problem of emulsification is disclosed in U.S. Pat. No. 5,100,582 to Bhattacharyya. This patent discloses polymeric demulsifiers for breaking water-in-oil emulsions, where the polymeric demulsifiers have random structures prepared using varying percentages of acrylic acid, methacrylic acid, ethyl hexyl acrylate, monomethyl acrylate and butyl acrylate as their effective constituents.

It would be desirable if compositions and methods were devised for more economical and/or more efficient treatment of combinations of oil and water for removal of the oil-based phase.

SUMMARY

There is provided, in one non-limiting form, a method for at least partially separating a combination of oil and water, where the method involves adding colloidal silica to the combination of oil and water, and adding a chemical to the combination of oil and water simultaneously with, prior to, and/or subsequent to adding the colloidal silica to the combination of oil and water. The chemical may be a cationic chemical, an anionic chemical, and/or an amphoteric chemical. The amounts of colloidal silica and chemical are effective to at least partially separate the oil from the water.

In another non-limiting embodiment there is provided a combination of oil and water that includes oil, water, colloidal silica, and a chemical selected from the group consisting of cationic chemicals, anionic chemicals, amphoteric chemicals and combinations thereof. Again, the amounts of colloidal silica and chemical are effective to at least partially separate the oil from the water.

There is additionally provided in another non-restrictive version a treating composition for at least partially separating a combination of oil and water, where the treating composition includes colloidal silica, and a chemical selected from the group consisting of cationic chemicals, anionic chemicals, amphoteric chemicals and combinations thereof.

DETAILED DESCRIPTION

It has been discovered that colloidal silica in conjunction with a chemical works very well as a clarification aid of combinations of oil and water, for instance wastewater, such as an oil-in-water (o/w) emulsion. The chemical may be cationic, anionic or amphoteric, or combinations of these chemicals.

As used herein "combination of oil and water" is intended to mean and refer to any water-based stream, the major constituent of which is either tap water, fresh water, a brine, salt water, seawater, or the like, either as a natural additive during a commercial manufacturing procedure, or in the fluids which are used to drill, complete or workover a subterranean oil or gas well, in production streams of fluid hydrocarbons from subterranean wells, and the like, regardless of whether the water is present intentionally, incidentally or accidentally. Also as used herein, the oil or other dispersed constituent in the oil-in-water emulsion or dispersion of a non-aqueous discontinuous phase which occurs in such aqueous systems may either be produced hydrocarbons, such as those which are found in a production well, or any hydrocarbon-, or grease-containing chemicals, sulfur, or similar constituent found in many typical manufacturing procedures, described above.

The present method contemplates contacting combinations of oil and water, e.g. containing an oil-in-water emulsion or dispersion of the non-aqueous discontinuous phase with an effective amount of the treating composition as herein described. Such contact can occur in a variety of forms, such as by introduction of a "pill" or "slug" of composition through a treatment line or conduit, such as is known to those skilled in the art in the treatment of produced hydrocarbons from subterranean oil and gas wells, or by continuous injection procedures via a pump. Additionally, the treating composition may be added to the aqueous system prior to formation of the oil-in-water emulsion or dispersion, or may be added to the water phase which is subsequently found to contain the oil-in-water emulsion or dispersion. Often, the method will involve an injection procedure wherein the treating composition will be continuously, or incrementally, introduced into the aqueous system containing the oil-in-water emulsion or dispersion of a non-aqueous discontinuous phase. The operator will adjust the pump speed based on conditions, in a non-limiting example, a condition such as the oil content in treated water.

The components of the treating composition, i.e. the colloidal silica and the chemical, may be added together, or added separately, in any order. In one non-limiting embodiment, the colloidal silica and the chemical are added in close proximity of each other. "Close proximity" is defined herein as from about 1 independently to about 20 feet (about 0.3 to about 6.1 meters); alternatively from about independently 2 to about 15 feet (about 0.6 to about 4.6 meters). There is evidence that the use of these two components together provide synergistic results, defined as giving more than an additive improvement of each of the components added separately.

In the oilfield there are online meters that measure the oil content of the water. In one non-limiting embodiment, it is suitable for the oil in the treated or clarified water to be below 5 ppm of oil. In the laboratory, hexane extractions may be used to measure the amount of oil in the water.

The methods and treating compositions herein may find beneficial use in oil-in-water emulsion separation (breaking), industrial and municipal wastewater clarification and sludge dewatering. The methods and treating compositions described herein are effective in a wider range of operations and maintains its performance under difficult conditions, for instance at a wider range of temperatures, where lower temperatures are more difficult to treat, and wider ranges of oil content where the higher the oil content, the more difficult the combination is to treat. In one non-limiting embodiment the temperature range may be from about 100 independently to about 300° F. (about 38 independently to about 149° C.), alternatively from about 150 independently to about 200° F. (about 65 independently to about 93° C.). Further, the methods and treating compositions described herein are able to tolerate slugs of chemicals that occasionally flow through the system, including, but not necessarily, chemicals (e.g. from drilling fluids, corrosion inhibitors, scale inhibitors, and the like) and minerals (e.g. diatomaceous earth and iron sulfide). "Slug" as used in this context means a relatively high concentration of the chemical or impurities such as minerals (anything besides oil or water).

The method described herein may be conducted in an apparatus including, but not necessarily limited to, a free water knockout (FWKO), a dissolved air flotation unit (DAF, such as a WEMCO® DEPURATOR gas flotation units available from Cameron), a skim tank, a water clarifier, a sludge dewatering belt press, and combinations thereof. It is expected that the methods and treating compositions herein would be useful in industrial and municipal wastewater clarification and sludge dewatering.

The method contemplates introduction of the treating composition at any desired point during the treatment of the combination of oil and water, such as prior to or at gravity settling equipment, flotation devices, filtration processes, sales lines, and the like. Because of apparent variations in operating parameters, such as the type and quantity of oil or other hydrocarbon or other constituents comprising the dispersed oil or non-aqueous discontinuous phase, the amount and quantity of water in the system, the clarification required for the treated aqueous system, and other physical and chemical parameters, as well as the particular colloidal silica and chemical(s) selected for use, an exact but general level of required additive can sometimes not be specified in advance. Those skilled in the art will recognize that known clarification and floc evaluation tests, may easily be used to determine the appropriate level of treatment for the particular application at hand.

Colloidal silicas are suspensions of fine amorphous, non-porous, and typically spherical silica particles in a liquid phase. Usually they are suspended in an aqueous phase that is stabilized electrostatically. Colloidal silicas may exhibit particle densities in the range of from about 1 independently to about 5 g/cm$^3$, alternatively from about 2.1 independently to about 2.3 g/cm$^3$. Most colloidal silicas may be prepared as monodisperse suspensions with particle sizes ranging from approximately 30 to 100 nm in diameter. Polydisperse suspensions may also be synthesized and have roughly the same limits in particle size. Smaller particles are difficult to stabilize while particles much greater than 150 nanometers are subject to sedimentation. However, it has been surprisingly discovered that the colloidal silicas of the present invention should have very small particles, for instance the particle size of the silica in the colloidal silica ranges from about 0.5 independently to about 10 nanometers, alternatively from about 2 independently to about 4 nanometers. Interestingly, colloidal silica will generally not work by itself. The word "independently" as used herein with respect to a range means that any lower threshold may be combined with any upper threshold to give a suitable alternative range.

A variety of different chemicals may be suitably used with the colloidal silica. Suitable cationic chemicals include, but are not necessarily limited to cationically-modified chemicals including, but not necessarily limited to, cationically-modified starches (such as corn, potato, wheat, tapioca, rice, water soluble starches and guar gum (if cationically-modified), but not necessarily limited to these), cationic polyacrylamides, zinc salts, aluminum salts, brine dispersant polymers (such as aluminum brine dispersion polymer), invert emulsion polymers (cationically-modified, water-soluble polymers such as copolymers of acrylamide and diallyl dimethylammonium chloride), polyamines, poly-DADMACs (polydiallyl-dimethylammonium chlorides), polyethyleneimines, glyoxylated polyacrylamide, polyguanidine, and combinations of these. In one non-restrictive embodiment, the cationically-modified chemicals are cationically modified using monomers including, but not necessarily limited to, methylene bis-acrylamide-methacryl-amide-propyl trimethyl-ammonium chloride (MAPTAC), acryloxyethyl trimethyl-ammonium chloride (AETAC), acrylamidopropyl trimethyl ammonium chloride (APTAC), and combinations thereof. Suitable anionic chemicals may include but are not necessarily limited to, acrylic latexes and dithiocarbamates (DTCs). Suitable nonionic chemicals include melamine formaldehydes. Suitable amphoteric chemicals include, but are not necessarily limited to, guar gum, amine condensates and non-ionic polyacrylamides. Suitable latexes include, but are not necessarily limited to crosslinked and non-crosslinked nonionic and anionic acrylic latex polymers. Suitable amine condensates include, but are not necessarily limited to, Amine N-1 (triethanolamine neutralized with glacial acetic acid or ethylenediamine polymerized with Epon 828 and then reacted with either carbon disulfide or zinc chloride, available from Huntsman Corporation). In the case where the chemicals are polymers, generally the molecular weight ranges may be from about 0.5 million independently to about 20 million weight average molecular weight; in one non-limiting embodiment from about 1 independently to about 15 million weight average molecular weight; alternatively from about 4 million independently to about 10 million weight average molecular weight; in a different non-limiting embodiment from about 10,000 independently to about 100,000 weight average molecular weight. Indeed, some water clarifier chemicals, such as dithiocarbamates, have relatively low weight average molecular weights, about 300 and higher; alternatively about 500 and higher, and in another non-limiting embodiment about 1000 and higher.

The amounts of the colloidal silica and the chemicals in the oil and water combination, for instance an o/w emulsion, are those effective for the stated purpose of at least partially separating the oil from the water; these are "effective amounts". More specifically, the amount of colloidal silica in the oil and water combination ranges from about 0.5 ppm independently to about 200 ppm, and the amount of the chemical in the oil and water combination ranges from about 1 ppm independently to about 1000 ppm. In alternate embodiments, the upper threshold of the chemical in the oil and water combination is about 800 ppm, about 600 ppm or about 400 ppm. In another non-limiting embodiment the amount of colloidal silica ranges from about 0.5 ppm independently to about 50 ppm and the amount of the chemical also ranges from about 5 ppm independently to about 50 ppm. In another non-limiting embodiment, the amounts of the colloidal silica and the chemical in the treating composition are about the same, however this is not a requirement.

The treating composition which includes the components and which is used in the method may contain other additives, including, but not necessarily limited to, hydrogen sulfide ($H_2S$) scavengers, scale and corrosion inhibitors, anti-oxidants, demulsifiers, or the like, provided that they are, of course, chemically compatible with the treating composition, and do not adversely interfere with the water clarification properties of the treating composition and method.

Such materials may be added in relative quantities to control the secondary properties so desired.

As a water clarifier, the treating composition may at least partially remove dispersed oil from water that has already been largely separated from the produced oilfield fluids. As a reverse emulsion breaker, the treating composition may be added to the fluid stream prior to separation of most of the bulk water from the produced fluid stream. Once the reverse emulsion is broken, i.e. the oil is separated from the water, and then the separated oil can be collected and removed from the fluid stream using known techniques and apparatus, some of which have been previously described.

The invention will now be further described with respect to the following Examples which are not meant to limit the invention, but rather to further illustrate the various embodiments.

EXAMPLES 1-32

After screening 143 water clarifiers between commercialized and experimental clarifiers, the following 31 chemicals were identified which performed acceptably as water clarifiers for produced water from an oilfield in California. It is very important to note that the fluid temperature was 50° F. to 60° F. (10° C. to 16° C.), which is a relatively low temperature that is more difficult to treat. Also, each of the chemicals were tested by itself alone and in combination with colloidal silica TRETOLITE® RBW 547 water clarifier available from Baker Hughes Incorporated, and as shown in Table II below, some of the chemicals were only used in the presence of TRETOLITE RBW 547. The other products noted in Table II with the RBW prefix are designations for other TRETOLITE products available from Baker Hughes Incorporated. Products with the 2060-prefix are non-commercial research products. Products with a RE prefix are non-commercial experimental products which are typically a blend of two or more commercial products or one or more commercial product with a commercial product of Baker Hughes Incorporated.

TABLE I

Explanation for the Bottle Test Evaluations Evaluation

| | |
|---|---|
| EXCELLENT | 6 |
| EXCELLENT− | 5.5 |
| GOOD+ | 5 |
| GOOD | 4.5 |
| FAIR+ | 4 |
| FAIR | 3.5 |
| FAIR− | 3 |
| POOR+ | 2.5 |
| POOR | 2 |
| POOR− | 1.5 |
| BAD | 1 |
| Good Performance | Y |
| Bad Performance | N |

TABLE II

Chemicals Tested

| Ex. | PRODUCT | 50 PPM | PLUS 50 PPM TRETOLITE RBW 547 |
|---|---|---|---|
| 1 | RBW-112 | N | Y |
| 2 | RBW-274 | Y | N |
| 3 | RBW-283 | Y | N |
| 4 | RBW-300 | Y | N |
| 5 | RBW-503X | N | Y |
| 6 | RBW-513 | Y | N |
| 7 | RBW-507 | Y | N |
| 8 | RBW-508 | Y | N |
| 9 | RBW-517 | N | Y |
| 10 | RBW-542 | Y | N |
| 11 | RBW-6012 | N | Y |
| 12 | RBW-6022Y | Y | N |
| 13 | RBW-6048 | Y | N |
| 14 | RBW-6060 | Y | N |
| 15 | RBW-6072 | N | Y |
| 16 | RBW-6512 | N | Y |
| 17 | RBW-6560 | Y | N |
| 18 | RE-5445-RBW | Y | N |
| 19 | RE-5967-RBW | N | Y |
| 20 | 2060-79 | N | Y |
| 21 | 2060-69 | N | Y |
| 22 | 2060-75 | N | Y |
| 23 | 2060-77 | N | Y |
| 24 | 2060-71 | N | Y |
| 25 | 2060-45 | N | Y |
| 26 | 2069-59 | N | Y |
| 27 | 2060-51 | N | Y |
| 28 | 2060-57 | N | Y |
| 29 | 2060-55 | N | Y |
| 30 | RE-31422 | N | Y |
| 31 | RE-31421 | N | Y |
| 32 | RE-31260 | N | Y |

The test of those 143 chemicals was performed at an oil dehydration station (which consists of several FWKOs, WEMCO DEPURATOR gas flotation units, wash tanks and LACTs (lease automatic custody tanks)) in the sample point located right before the chemical injection before the oil dehydration station.

After selecting the best performing chemicals, they were tested at a lower dosage, and they were also combined with TRETOLITE RBW 547. Also, this test was performed at the oil dehydration station in the sample point located right before the chemical injection before a FWKO. The results are presented in Table III.

TABLE III

Results of Test Best Performing Chemicals

| Ex. | PRODUCTS | 50 PPM | 50 PPM/50 PPM TRETOLITE RBW 547 | 40 PPM | 40 PPM/40 PPM TRETOLITE RBW 547 | 30 PPM | 30PPMC TRETOLITE RBW 547 |
|---|---|---|---|---|---|---|---|
| 1 | RBW-112 | 2 | 3 | 2 | 3 | 2 | 3 |
| 2 | RBW-274 | 6 | 6 | 6 | 6 | 6 | 6 |
| 3 | RBW-283 | 6 | 6 | 6 | 6 | 6 | 6 |

TABLE III-continued

Results of Test Best Performing Chemicals

| Ex. | PRODUCTS | 50 PPM | 50 PPM/50 PPM TRETOLITE RBW 547 | 40 PPM | 40 PPM/40 PPM TRETOLITE RBW 547 | 30 PPM | 30PPMC TRETOLITE RBW 547 |
|---|---|---|---|---|---|---|---|
| 4 | RBW-300 | 4 | 3 | 4 | 3 | 3 | 2 |
| 5 | RBW-503X | 3 | 4 | 3 | 4 | 3 | 3 |
| 6 | RBW-513 | 3 | 4 | 3 | 4 | 3 | 4 |
| 7 | RBW-507 | 3 | 3 | 3 | 3 | 3 | 3 |
| 8 | RBW-508 | 4 | 4 | 4 | 4 | 4 | 4 |
| 9 | RBW-517 | 5 | 6 | 5 | 6 | 5 | 6 |
| 10 | RBW-542 | 4 | 5 | 4 | 5 | 4 | 5 |
| 11 | 6012 | 3 | 5 | 3 | 5 | 2 | 4 |
| 12 | 6022Y | 4 | 5 | 3 | 5 | 3 | 5 |
| 13 | 6048 | 4 | 5 | 4 | 5 | 3 | 4 |
| 14 | 6060 | 4 | 5.5 | 4 | 5.5 | 4 | 5 |
| 15 | 6072 | 3 | 5 | 3 | 4 | 3 | 4 |
| 16 | 6512 | 3 | 4 | 3 | 4 | 3 | 4 |
| 17 | 6560 | 3 | 3 | 3 | 3 | 3 | 3 |
| 18 | RE-5445-RBW | 3 | 3 | 3 | 3 | 3 | 3 |
| 19 | RE-5967-RBW | 3 | 3 | 3 | 3 | 3 | 3 |
| 20 | 2060-79 | 4 | 5 | 4 | 4.5 | 4.5 | 4.5 |
| 21 | 2060-69 | 5 | 5.5 | 4 | 4.5 | 3 | 3.5 |
| 22 | 2060-75 | 4 | 5.5 | 4 | 5.5 | 4 | 5 |
| 23 | 2060-77 | 4.5 | 6 | 4.5 | 6 | 4.5 | 5 |
| 24 | 2060-71 | 4.5 | 5.5 | 4 | 5 | 4 | 5 |
| 25 | 2060-45 | 4.5 | 6 | 4.5 | 6 | 4 | 5.5 |
| 26 | 2069-59 | 4 | 5 | 4 | 5 | 3 | 4 |
| 27 | 2060-51 | 4 | 5.5 | 4 | 5.5 | 4 | 5 |
| 28 | 2060-57 | 3 | 3 | 3 | 3 | 3 | 3 |
| 29 | 2060-55 | 4.5 | 6 | 4.5 | 6 | 4.5 | 5.5 |
| 30 | RE-31422 | 4 | 4.5 | 4 | 4.5 | 4 | 4 |
| 31 | RE-31421 | 4 | 5.5 | 4 | 5 | 4 | 4 |
| 32 | RE-31260 | 3 | 5.5 | 3 | 5 | 3 | 5 |

EXAMPLES 33-41

For the following tests the best nine performing chemicals were selected and tested alone at doses of 10, 20, and 30 ppm, as well as combined with TRETOLITE RBW 547 at 1:0.5, 1:1, 1:1.5 and 1:2 ppm as shown, obtaining the results that RBW-274 at 30 ppm and RBW-517 (a brine dispersion polymer) at 20 ppm combined with TRETOLITE RBW 547 were the two best performing chemicals (note the evaluation scores of "6" in boldface in Table IV where the results are presented). This test was executed at a different oil dehydration station from the one previously noted.

EXAMPLES 41-44

Figure 1:
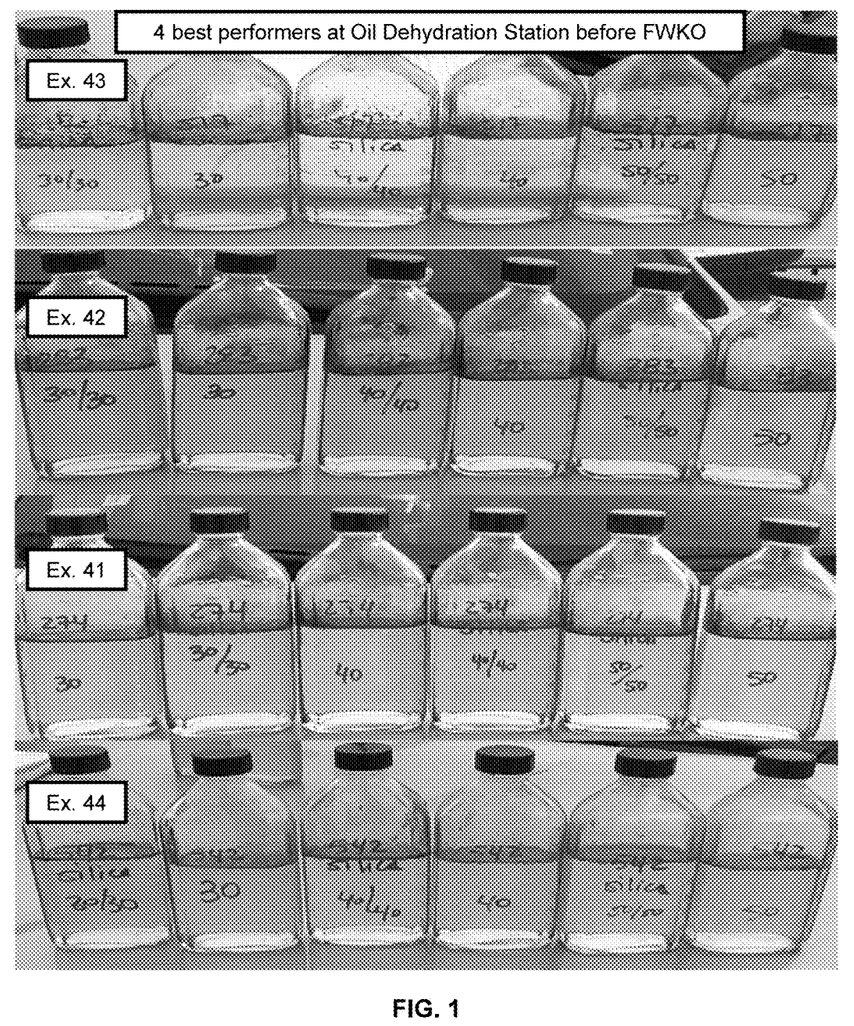
FIG. 1 is a set of four photographs giving visual evidence of the bottle tests for the four best performing chemicals of Examples 41-44 at an oil dehydration station before a free water knock-out (FWKO)
Figure 2:
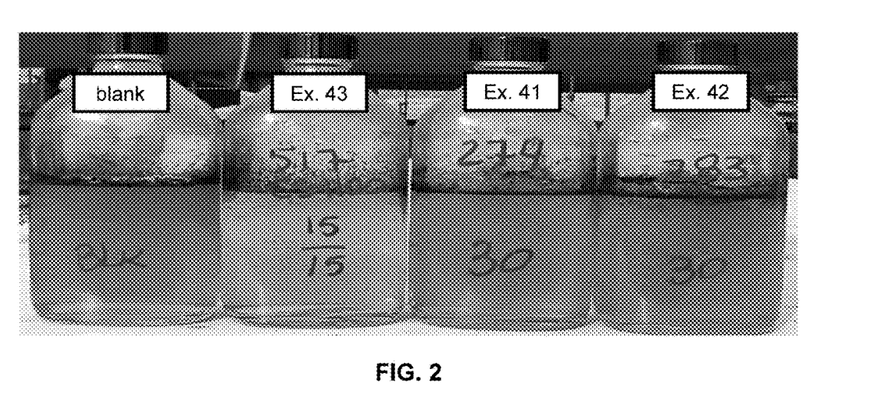
FIG. 2 is a photograph giving visual evidence of the bottle tests showing a blank and results for Examples 41-43.
Figure 3:
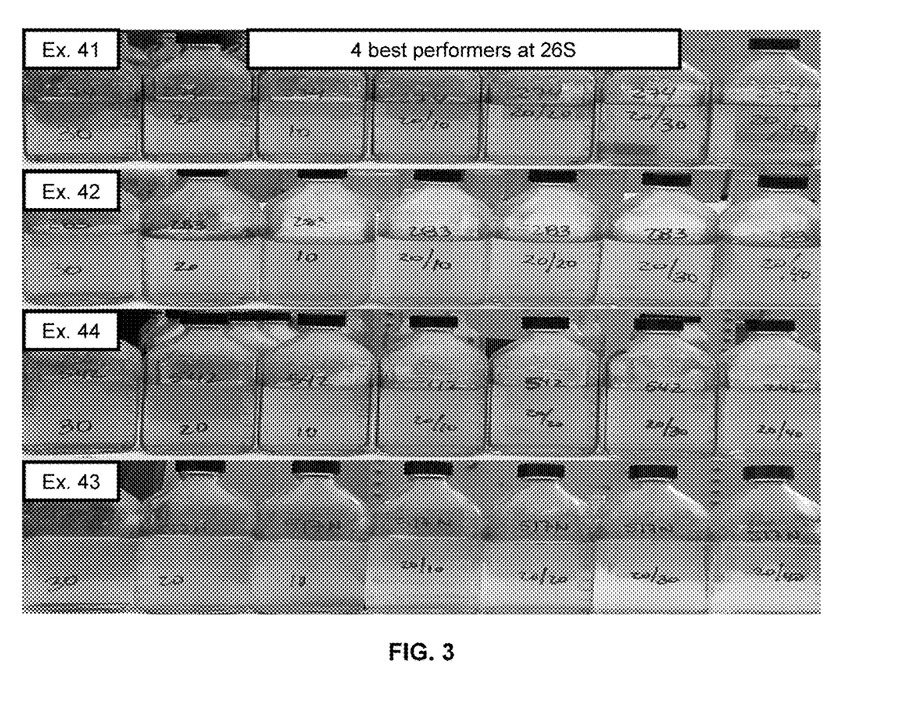
FIG. 3 is a set of four photographs giving visual evidence of the bottle tests for the four best performing chemicals of Examples 41-44 at another oil dehydration station.

The last test was performed with water from the oil dehydration station FWKO. The four best performing chemicals were further tested at 10, 20, and 30 ppm and combined with TRETOLITE RBW 547 1:1 at 15 ppm, each. Definitely, the best performing scenario was the combination of RBW-517 with TRETOLITE RBW 547 at 15 ppm each (Example 43, in boldface). However, RBW-274 also performed acceptable at 30 ppm (Example 41). Photographs of the bottles for Examples 41-44 are presented in FIGS. 1-3 as visual evidence.

TABLE IV

Further Evaluation of Nine Best Performing Chemicals

| Ex. | PRODUCTS | 30 PPM | 20 PPM | 10 PPM | 20 PPM/10 PPM TRETOLITE RBW 547 | 20 PPM/20 PPM TRETOLITE RBW 547 | 20 PPM/30 PPM TRETOLITE RBW 547 | 20 PPM/40 PPM TRETOLITE RBW 547 |
|---|---|---|---|---|---|---|---|---|
| 33 | RBW-274 | 6 | 6 | 5.5 | 5.5 | 5.5 | 5.5 | 5.5 |
| 34 | RBW-283 | 5 | 5.5 | 4 | 5 | 5 | 5 | 5 |
| 35 | RBW-517 | 4.5 | 4.5 | 4 | 5 | 6 | 6 | 6 |
| 36 | RBW-542 | 5 | 5 | 5 | 5 | 5 | 5 | 5 |
| 37 | 2060-69 | 4.5 | 4.5 | 4.5 | 4.5 | 4.5 | 5 | 5 |
| 38 | 2060-55 | 4 | 4.5 | 4.5 | 4.5 | 5 | 5.5 | 5.5 |
| 39 | 2060-45 | 5 | 5 | 5 | 5 | 5.5 | 5.5 | 5.5 |
| 40 | 2060-77 | 4 | 4.5 | 4 | 4.5 | 4.5 | 4.5 | 5 |
| 41 | 2060-71 | 4 | 4 | 4 | 4.5 | 4.5 | 5 | 5 |

TABLE V

Further Evaluation of Four Best Performing Chemicals

| Ex. | PRODUCTS | 30 PPM | 20 PPM | 10 PPM | 15 PPM/15 PPM TRETOLITE RBW 547 |
|---|---|---|---|---|---|
| 41 | RBW-274 | 5.5 | 5 | 5 | 5 |
| 42 | RBW-283 | 5 | 5 | 4 | 4 |
| 43 | RBW-517 | 5 | 4.5 | 4 | 6 |
| 44 | RBW-542 | 5 | 4.5 | 4 | 4 |

EXAMPLE 45

Figure 4:
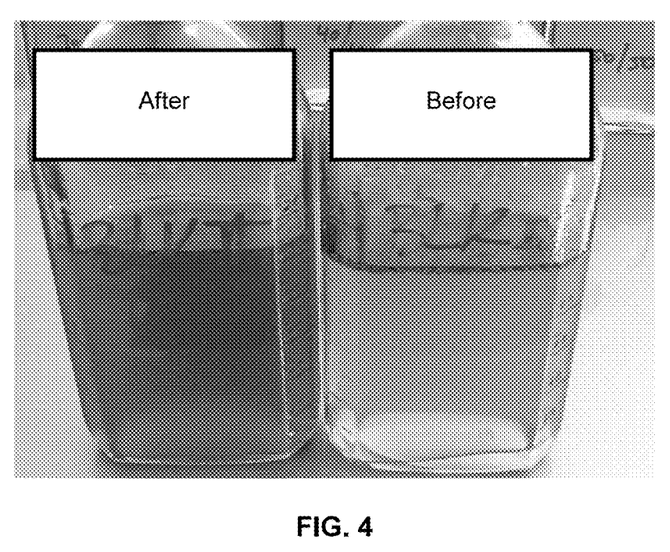
FIG. 4 is a photograph of two bottles showing samples from the oil dehydration station before and after the fluid was hit by a slug.

Finally, during the sampling at the oil dehydration station before the FWKO a sample was collected before and after the fluid was hit by a slug. As can be observed in the photograph of FIG. 4, the slug degrades the quality of the fluid. FIG. 4 illustrates that the slug makes the reverse emulsion more difficult to treat. The use of colloidal silica together with a water soluble polymer will operate much better to separate the oil and water in such an emulsion as compared to a traditional single-component system; thus the method and compositions described herein have a wider window of operation.

It is to be understood that the invention is not limited to the exact details of the methods, operation, exact treatment compositions, or embodiments shown and described, as modifications and equivalents will be apparent to one skilled in the art. Accordingly, the invention is therefore to be limited only by the scope of the appended claims. Further, the specification is to be regarded in an illustrative rather than a restrictive sense. For example, specific combinations of components to make the treatment compositions, colloidal silicas, chemicals, components, o/w emulsions and other oil and water combinations, and method steps falling within the claimed parameters, but not specifically identified or tried in a particular method or compositions, are anticipated to be within the scope of this invention.

The terms "comprises" and "comprising" in any claims should be interpreted to mean including, but not limited to, the recited elements.

The present invention may suitably comprise, consist or consist essentially of the elements disclosed and may be practiced in the absence of an element not disclosed. For example, there may be provided a treating composition for at least partially separating a combination of oil and water, where the treating composition consists of or consists essentially of colloidal silica and a chemical selected from the group consisting of cationic chemicals, anionic chemicals, nonionic chemicals, amphoteric chemicals and combinations thereof.

In an additional non-limiting version, there may be provided a method for at least partially separating a combination of oil and water where the method consists of or consists essentially of adding colloidal silica to the combination of oil and water, and adding a chemical to the combination of oil and water simultaneously with, prior to and/or subsequent to adding the colloidal silica to the combination of oil and water, where the chemical is selected from the group consisting of cationic chemicals, anionic chemicals, nonionic chemicals, amphoteric chemicals and combinations thereof; where the amounts of colloidal silica and chemical are effective to at least partially separate the oil from the water.

PRODUCT GLOSSARY

| Product Name | Product Description |
|---|---|
| 2060-45 | Starch |
| 2060-51 | Starch |
| 2060-55 | Starch |
| 2060-57 | Starch |
| 2060-69 | Starch |
| 2060-71 | Starch |
| 2060-75 | Starch |
| 2060-77 | Starch |
| 2060-79 | Starch |
| 2069-59 | Starch |
| RBW-112 | Solution polymer |
| RBW-274 | Dithiocarbamate |
| RBW-283 | Dithiocarbamate |
| RBW-300 | Solution polymer |
| RBW-503X | Solution polymer |
| RBW-507 | Invert emulsion polymer |
| RBW-508 | Solution polymer - aluminum based |
| RBW-513 | DTC/Latex dispersion blend |
| RBW-517 | Brine dispersion polymer |
| RBW-542 | Dithiocarbamate |
| RBW-6012 | Solution polymer |
| RBW-6022Y | Dithiocarbamate |
| RBW-6048 | Latex dispersion |
| RBW-6060 | Latex dispersion |
| RBW-6072 | Solution polymer |
| RBW-6512 | Solution polymer |
| RBW-6560 | Latex dispersion |
| RE-5445-RBW | Latex dispersion |
| RE-5967-RBW | Brine dispersion polymer |
| RE-31260 | Poly(vinyl alcohol) |
| RE-31421 | Cationic solution polymer |
| RE-31422 | Cationic solution polymer |

What is claimed is:

1. A method for at least partially separating a combination of oil and water comprising:
    adding colloidal silica to the combination of oil and water, where the oil is produced from an oil field or where the combination of oil and water is a combination produced from an oilfield, where the amount of colloidal silica in the oil and water combination ranges from about 0.5 ppm to about 200 ppm; and
    adding a chemical to the combination of oil and water simultaneously with, prior to, and/or subsequent to adding the colloidal silica to the combination of oil and water, where the chemical is selected from the group consisting of at least one anionic dithiocarbamate (DTC) and at least one cationic aluminum brine dispersion polymer, where the amount of the chemical in the oil and water combination ranges from about 1 ppm to about 1000 ppm;
    where the amounts of the colloidal silica and the chemical are effective to at least partially separate the oil from the water, and where particle size of silica in the colloidal silica ranges from about 0.5 to about 10 nanometers.

2. The method of claim 1 where the method is conducted in an apparatus selected from the group consisting of a free water knockout, a dissolved air flotation unit, a skim tank, a water clarifier, a sludge dewatering belt press, and combinations thereof.

3. The method of claim 1 where the combination of oil and water is selected from the group consisting of an oil-in-water emulsion, a bicontinuous emulsion, and combinations thereof.

4. A method for at least partially separating a combination of oil and water comprising:
    adding colloidal silica to the combination of oil and water, where the oil is produced from an oil field or where the combination of oil and water is a combination produced from an oilfield, where the amount of colloidal silica in the oil and water combination ranges from about 0.5 ppm to about 200 ppm, and where particle size of silica in the colloidal silica ranges from about 0.5 to about 10 nanometers; and adding a chemical to the combination of oil and water simultaneously with, prior to, and/or subsequent to adding the colloidal silica to the combination of oil and water, where the chemical is selected from the group consisting of aluminum brine dispersion polymers, alone or in combination with dithiocarbamates (DTCs), where the amount of the chemical in the oil and water combination ranges from about 1 ppm to about 1000 ppm; and at least partially separating the oil from the water.

5. The method of claim 4 where the combination of oil and water is selected from the group consisting of an oil-in-water emulsion, a bicontinuous emulsion, and combinations thereof.

* * * * *